United States Patent
Gao et al.

(10) Patent No.: US 12,073,243 B2
(45) Date of Patent: *Aug. 27, 2024

(54) METHOD AND APPARATUS FOR DETERMINING VIRTUAL MACHINE MIGRATION

(71) Applicant: HUAWEI TECHNOLOGIES CO., LTD., Guangdong (CN)

(72) Inventors: Yuan Gao, Nanjing (CN); Xingguo Sun, Nanjing (CN); Wenhui Liang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,179

(22) Filed: Nov. 29, 2020

(65) Prior Publication Data
US 2021/0200578 A1 Jul. 1, 2021

Related U.S. Application Data

(63) Continuation of application No. 16/135,996, filed on Sep. 19, 2018, now Pat. No. 10,853,127, which is a
(Continued)

(30) Foreign Application Priority Data

Aug. 30, 2016 (CN) .......................... 201610777000.1

(51) Int. Cl.
*G06F 9/48* (2006.01)
*G06F 9/455* (2018.01)
(Continued)

(52) U.S. Cl.
CPC ........ *G06F 9/4856* (2013.01); *G06F 9/45558* (2013.01); *H04L 12/4633* (2013.01);
(Continued)

(58) Field of Classification Search
CPC .. G06F 9/4856; G06F 9/45558; G06F 9/4411; G06F 2009/4557;
(Continued)

(56) References Cited

U.S. PATENT DOCUMENTS 8,532,116 B2   9/2013   Portolani et al.
8,738,803 B2   5/2014   Onoue
(Continued)

FOREIGN PATENT DOCUMENTS

CN   102801715 A   11/2012
CN   103259727 A   8/2013
(Continued)

OTHER PUBLICATIONS

Garrett et al., Request for Comments (RFC) 1433, Direct ARP, Network Working Group, pp. 1-19, Mar. 1993. (Year: 1993).*
(Continued)

*Primary Examiner* — Patrice L Winder
(74) *Attorney, Agent, or Firm* — James Harrison

(57) ABSTRACT

Embodiments of this application provide a method and an apparatus for determining virtual machine VM migration. The method includes: after a VM is migrated, sending a gratuitous ARP packet or a RARP packet to an in-migration VTEP device; obtaining, by the VTEP device, a MAC address of the VM, searching an ARP cache table based on the MAC address, and obtaining an IP address of the VM; and constructing an ARP unicast request packet by using the IP address as a destination IP address, and if the VTEP device receives an ARP response packet sent by the VM for the ARP unicast request packet, determining that the VM is migrated.

23 Claims, 5 Drawing Sheets

Related U.S. Application Data continuation of application No. PCT/CN2017/075619, filed on Mar. 3, 2017.

(51) Int. Cl.
| | |
|---|---|
| *H04L 12/46* | (2006.01) |
| *H04L 45/64* | (2022.01) |
| *H04L 61/103* | (2022.01) |
| *H04L 61/4552* | (2022.01) |
| *H04L 61/58* | (2022.01) |
| *G06F 9/4401* | (2018.01) |
| *H04L 101/622* | (2022.01) |

(52) U.S. Cl.
CPC .......... *H04L 12/4641* (2013.01); *H04L 45/64* (2013.01); *H04L 61/103* (2013.01); *H04L 61/4552* (2022.05); *H04L 61/58* (2022.05); *G06F 9/4411* (2013.01); *G06F 2009/4557* (2013.01); *G06F 2009/45579* (2013.01); *G06F 2009/45595* (2013.01); *H04L 2101/622* (2022.05)

(58) Field of Classification Search
CPC . G06F 2009/45579; G06F 2009/45595; H04L 12/4633; H04L 12/4641; H04L 45/64; H04L 61/103; H04L 61/1552; H04L 61/6009; H04L 61/6022; H04L 61/4552; H04L 61/58; H04L 2101/622
See application file for complete search history.

(56) References Cited

U.S. PATENT DOCUMENTS

| | | | |
|---|---|---|---|
| 9,055,000 B1* | 6/2015 | Ghosh | H04L 45/74 |
| 9,515,924 B2 | 12/2016 | Keesara et al. | |
| 9,590,824 B1 | 3/2017 | Sikand et al. | |
| 9,733,968 B2 | 8/2017 | Narasimhamurthy et al. | |
| 9,923,780 B2 | 3/2018 | Rao et al. | |
| 9,935,862 B2 | 4/2018 | Kanevsky | |
| 10,079,752 B2 | 9/2018 | Manthiramoorthy et al. | |
| 10,320,838 B2 | 6/2019 | Srinivasan et al. | |
| 2011/0019676 A1 | 1/2011 | Portolani et al. | |
| 2013/0262647 A1* | 10/2013 | Kurita | H04L 41/0803 |
| | | | 709/223 |
| 2014/0064104 A1* | 3/2014 | Nataraja | H04L 61/103 |
| | | | 370/254 |
| 2014/0376550 A1 | 12/2014 | Khan et al. | |
| 2015/0071289 A1* | 3/2015 | Shin | H04L 45/745 |
| | | | 370/392 |
| 2015/0163192 A1* | 6/2015 | Jain | H04L 43/0823 |
| | | | 370/255 |
| 2015/0222509 A1* | 8/2015 | Hyoudou | H04L 43/0817 |
| | | | 370/241 |
| 2015/0281062 A1* | 10/2015 | Duda | H04L 45/74 |
| | | | 709/238 |
| 2015/0281067 A1 | 10/2015 | Wu | |
| 2016/0028624 A1 | 1/2016 | Song et al. | |
| 2016/0036703 A1 | 2/2016 | Josyula | |
| 2016/0142313 A1 | 5/2016 | Devireddy et al. | |
| 2016/0173356 A1* | 6/2016 | Jiang | H04L 43/0817 |
| | | | 370/400 |
| 2016/0294769 A1 | 10/2016 | Song et al. | |
| 2016/0352682 A1* | 12/2016 | Chang | H04L 67/10 |
| 2017/0286158 A1 | 10/2017 | Dai et al. | |
| 2017/0289033 A1 | 10/2017 | Singh et al. | |
| 2017/0373973 A1* | 12/2017 | Bickhart | H04L 45/64 |
| 2018/0013674 A1* | 1/2018 | Nainar | H04L 61/103 |
| 2018/0219773 A1 | 8/2018 | Li | |

FOREIGN PATENT DOCUMENTS

| | | | | |
|---|---|---|---|---|
| CN | 103430149 | A | 12/2013 | |
| CN | 103647853 | A | 3/2014 | |
| CN | 105453523 | A | 3/2016 | |
| CN | 105471744 | A | 4/2016 | |
| CN | 105743792 | A | 7/2016 | |
| CN | 112486626 | A | 3/2021 | |
| EP | 2782009 | A1 | 9/2014 | |
| EP | 2840743 | A1 | 2/2015 | |
| JP | 2015002438 | A | 1/2015 | |
| WO | WO-2013020126 | A1 * | 2/2013 | ........... H04L 41/145 |

OTHER PUBLICATIONS

Ali Sajassi et al.:Integrated Routing and Bridging in EVPN, draft-ietf-bess-evpn-inter-subnet-forwarding-01,L2VPN Workgroup, Internet-Draft, Oct. 18, 2015. total 26 pages.

J. Rabadan, Ed et al,"Operational Aspects of Proxy-ARP/ND in EVPN Networks, draft-ietf-bess-evpn-proxy-arp-hd-00", BESS Workgroup Internet Draft, Apr. 4, 2016, total 22 pages.

E. Rosen et al., "BGP/MPLS IP Virtual Private Networks (VPNs)", Network Working Group, RFC 4364, Feb. 2006, total 47 pages.

K. Kompella, Ed et al,"Virtual Private LAN Service (VPLS), Using BGP for Auto-Discovery and Signaling", Network Working Group, RFC 4761, Jan. 2007, total 28 pages.

A. Sajassi et al,"Requirements for Ethernet VPN (EVPN)", Internet Engineering Task Force (IETF), RFC 7209, May 2014, total 15 pages.

A. Sajassi, Ed et al,"BGP MPLS-Based Ethernet VPN", Internet Engineering Task Force (IETF), RFC 7432, Feb. 2015, total 56 pages.

A. Sajassi, Ed et al,"Provider Backbone Bridging Combined with Ethernet VPN (PBB-EVPN)", Internet Engineering Task Force (IETF), RFC7623, Sep. 2015, total 23 pages.

\* cited by examiner

METHOD AND APPARATUS FOR DETERMINING VIRTUAL MACHINE MIGRATION

CROSS-REFERENCE TO RELATED APPLICATIONS

This application is a continuation of U.S. patent application Ser. No. 16/135,996, filed on Sep. 19, 2018, which is a continuation of International Application No. PCT/CN2017/075619 filed on Mar. 3, 2017, which claims priority to Chinese Patent Application No. 201610777000.1 filed on Aug. 30, 2016. All of the aforementioned applications are hereby incorporated by reference in their entireties.

TECHNICAL FIELD

This application relates to the field of communications technologies, and in particular, to a method and an apparatus for determining virtual machine (VM) migration.

BACKGROUND

In a multi-tenant environment of cloud computing, a logical network that can be well isolated from another logical network needs to be allocated to each tenant, and isolation of the logical network may be implemented by using a virtual extensible local area network (VXLAN) technology. A VXLAN network is identified by a 24-bit VXLAN network identifier (VNI).

Generally, the VXLAN is deployed in a data center (DC) network, and a VXLAN tunnel end point (VTEP) is responsible for encapsulating and decapsulating a VXLAN packet. VTEPs communicate with each other by using a VXLAN tunnel.

With wide use of a server virtualization technology of a DC, virtual machine (VM) migration is often performed in the DC. In the prior art, when a virtual machine is migrated from a first VTEP to a second VTEP, the VM sends a gratuitous Address Resolution Protocol (ARP) packet to the second VTEP. The second VTEP learns a host route of the VM by using the gratuitous ARP, and compares the obtained host route of the VM with an Ethernet virtual private network (EVPN) integrated routing and bridging (IRB) route that is previously obtained from the first VTEP, so as to determine whether the VM is migrated.

It can be learned from the foregoing that in the prior art, the virtual machine migration is perceived depending on the gratuitous ARP packet sent by the VM. However, VMs of many vendors currently do not send a gratuitous ARP packet after migration, but send a Reverse Address Resolution Protocol (RARP) packet. The RARP packet carries only a Media Access Control (MAC) address of the virtual machine. In the prior art, an in-migration VTEP cannot determine, based on the RARP packet, that the virtual machine is migrated.

Further, in the prior art, a VTEP from which the virtual machine is out-migrated cannot quickly perceive that an accessed virtual machine is out-migrated, and consequently a network cannot perform route convergence in a timely manner.

SUMMARY

Embodiments of this application provide a method and an apparatus for determining virtual machine migration, and a system. In this way, after a VM is migrated, an in-migration device does not need to be limited by a case in which the virtual machine sends a gratuitous ARP packet, to perceive in-migration of the VM. This effectively improves compatibility of a virtual machine configuration. Further, an out-migration device can quickly and accurately perceive the virtual machine migration.

According to a first aspect, an embodiment of this application provides a method for determining virtual machine VM migration. First, a first VTEP device obtains a MAC address of a VM from a first interface. The first interface is connected to an attachment circuit AC, and for example, the first interface may be an eth1 interface of a VTEP. The first VTEP device searches, by using the MAC address as a keyword, an ARP cache table stored in the first VTEP device, and determines, based on a result of table lookup, that the ARP cache table records that the VM accesses a second VTEP device. The first VTEP device obtains an Internet Protocol (English: Internet Protocol, IP) address of the VM according to the ARP cache table, constructs an ARP unicast request packet by using the IP address as a destination IP address, and sends the ARP unicast request packet to the first interface. If receiving, from the first interface, an ARP response packet sent by the VM for the ARP unicast request packet, the first VTEP device determines that the VM is migrated. To be specific, the VM is migrated from another VTEP device to the first VTEP device.

It can be learned that, in the method provided in this embodiment of this application, after the VM is migrated, an in-migration device of the VM needs to obtain only the MAC address of the VM, then may obtain the IP address of the VM by searching the ARP cache table, and further determine, through ARP learning, whether the VM is migrated. In this way, after the VM is migrated, the in-migration device does not need to be limited by a case in which the virtual machine sends a gratuitous ARP packet, to perceive in-migration of the VM. This effectively improves compatibility of a virtual machine configuration.

With reference to the first aspect, in a first possible implementation of the first aspect, the method further includes: generating, by the first VTEP device, a host route of the VM based on the ARP unicast request packet or the ARP response packet, and synchronizing the host route of the VM to the other VTEP device.

Each VTEP device obtains, by synchronizing host routes of respective accessed virtual machines between VTEP devices, host routes of virtual machines that access all peer end VTEP devices, so as to speed up network route convergence.

With reference to the first aspect and the foregoing possible implementation, in a second possible implementation of the first aspect, after the first VTEP device determines that the VM is migrated, the first VTEP device updates, based on an IP address of a VTEP accessed by the VM after migration, ARP cache entry information corresponding to the VM, and synchronizes the ARP cache entry information to the other VTEP device.

ARP cache table information is synchronized between the VTEP devices, and consequently, each VTEP device obtains ARP cache table information stored in all the peer end VTEP devices, further obtains routing information of the accessed virtual machines stored in all the peer end VTEP devices, and can quickly and accurately perceive the virtual machine migration by searching the ARP cache table when the virtual machine is migrated.

With reference to the first aspect and the foregoing possible implementations, in a third possible implementation of the first aspect, the first VTEP device obtains the MAC address of the VM based on a Reverse Address Resolution Protocol RARP packet or a gratuitous ARP packet that is sent by the VM and that is received by the first interface.

According to a second aspect, an embodiment of this application provides a method for determining virtual machine VM migration. First, a second VTEP device receives ARP cache entry information that is corresponding to a VM and that is sent by a first VTEP device. The second VTEP device determines, based on the received ARP cache entry information, that the ARP cache entry information records that the VM accesses the first VTEP device. The second VTEP device determines that an ARP cache table stored in the second VTEP device records that the VM is a local host accessing the second VTEP device. To be specific, the second VTEP device receives the ARP cache entry information sent by the first VTEP device, and the ARP cache entry information records that the VM accesses the first VTEP device. However, a table stored in the second VTEP device records that the VM is a local device accessing the second VTEP device. Therefore, the second VTEP device obtains an IP address of the VM, and may obtain the IP address by using the ARP cache table stored in the second VTEP device, or may obtain the IP address by using the ARP cache entry information sent by the first VTEP device. After obtaining the IP address of the VM, the second VTEP device constructs and sends an ARP unicast request packet by using the IP address as a destination IP address. If the second VTEP device does not receive, within a predetermined time, an ARP response packet sent by the VM for the ARP unicast request packet, the second VTEP device determines that the VM is migrated, to be specific, the VM is out-migrated from the second VTEP device.

In the method provided in this embodiment, after receiving ARP cache entry information sent by all peer end devices, a VTEP device triggers the VTEP device to determine whether the virtual machine is migrated, so as to quickly and accurately perceive the virtual machine migration.

With reference to the second aspect, in a first possible implementation of the second aspect, after the second VTEP device determines that the VM is migrated, the second VTEP device deletes an ARP cache entry corresponding to the VM from the ARP cache table stored in the second VTEP device.

When the second VTEP device does not receive the ARP response packet within the predetermined time, the second VTEP device deletes the ARP cache entry corresponding to the VM from the ARP cache table stored in the second VTEP device, and does not need to wait until an aging time of the ARP cache entry expires before performing aging. Therefore, an ARP cache table resource occupied by the ARP cache entry information is saved.

With reference to the second aspect and the foregoing possible implementation, in a second possible implementation of the second aspect, after the second VTEP device determines that the VM is migrated, the second VTEP device cancels a host route, pointing to the second VTEP device, of the VM, and sends control information to another VTEP device. The control information is used to instruct the other VTEP device to cancel the host route, pointing to the second VTEP device, of the VM.

Therefore, when determining that a host device that accesses the VTEP device is migrated, the VTEP device cancels the host route of the out-migrated virtual machine and sends the canceled host route of the out-migrated virtual machine to the another VTEP device, so as to speed up route convergence.

With reference to the second aspect and the foregoing possible implementations, in a third possible implementation of the second aspect, after the second VTEP device determines that the VM is migrated, the second VTEP device updates, by using the ARP cache entry information sent by the first VTEP device, the ARP cache entry that is corresponding to the VM in the ARP cache table stored in the second VTEP device.

After obtaining synchronous ARP cache table information sent by a peer end VTEP device, the VTEP device updates the ARP cache table information stored in the VTEP device and updates in real time host routes of accessed virtual machines stored in all peer end VTEP devices, and can quickly and accurately perceive the virtual machine migration by searching the ARP cache table when the virtual machine is migrated, and speed up the route convergence.

According to a third aspect, an embodiment of this application provides an apparatus for determining virtual machine migration, configured to perform the method in the first aspect or any possible implementation of the first aspect. Specifically, the apparatus includes a module that is configured to perform the method in the first aspect or any possible implementation of the first aspect.

According to a fourth aspect, an embodiment of this application provides an apparatus for determining virtual machine migration, configured to perform the method in the second aspect or any possible implementation of the second aspect. Specifically, the apparatus includes a module that is configured to perform the method in the second aspect or any possible implementation of the second aspect.

According to a fifth aspect, an embodiment of this application provides a communications system, including the apparatus provided in the third aspect and the apparatus provided in the fourth aspect.

According to a sixth aspect, an embodiment of this application provides an apparatus for determining virtual machine migration, where the apparatus includes an input interface, an output interface, a processor, and a memory. The input interface, the output interface, the processor, and the memory may be interconnected by using a bus system. The memory is configured to store a program, an instruction, or code. The processor is configured to execute the program, the instruction, or the code in the memory, to perform the method in the first aspect or any possible implementation of the first aspect.

According to a seventh aspect, an embodiment of this application provides an apparatus for determining virtual machine migration, where the apparatus includes an input interface, an output interface, a processor, and a memory. The input interface, the output interface, the processor, and the memory may be interconnected by using a bus system. The memory is configured to store a program, an instruction, or code. The processor is configured to execute the program, the instruction, or the code in the memory, to perform the method in the second aspect or any possible implementation of the second aspect.

According to an eighth aspect, an embodiment of this application provides a communications system, including the apparatus provided in the sixth aspect and the apparatus provided in the seventh aspect.

According to a ninth aspect, an embodiment of this application provides a computer-readable storage medium, configured to store a computer program, where the computer program is used to execute an instruction of the method in the first aspect, the second aspect, any possible implementation of the first aspect, or any possible implementation of the second aspect.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show only some embodiments of the present application, and a person of ordinary skill in the art may still derive other drawings from these accompanying drawings without creative efforts.

DETAILED DESCRIPTION

The following describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

The application scenario described in the embodiments of this application is intended to more clearly describe the technical solutions in the embodiments of this application, and does not constitute a limitation on the technical solutions provided in the embodiments of this application. A person of ordinary skill in the art may know that, with evolution of a network architecture and emergence of a new service scenario, the technical solutions provided in the embodiments of this application are also applied to a similar technical problem.

Unless otherwise stated, in the embodiments of this application, ordinal numbers such as "first" and "second" are intended to distinguish between a plurality of objects, and not intended to limit a sequence of the plurality of the objects. The following provides an example description of an application scenario according to an embodiment of this application with reference to FIG. 1.

Figure 1:
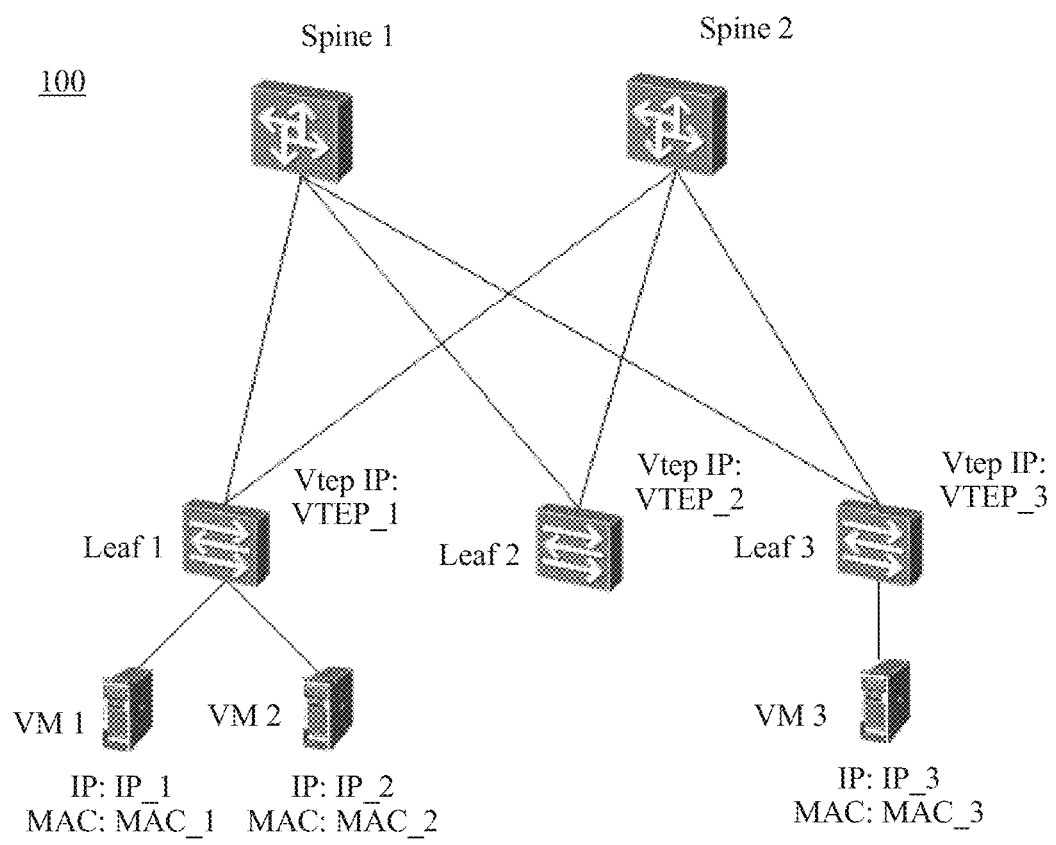
FIG. 1 is a schematic diagram of an application scenario according to an embodiment of this application.

FIG. 1 shows an example of a VXLAN network 100 applied to an embodiment of this application. The network includes core layer devices spine 1 and spine 2, and access stratum devices leaf 1, leaf 2, and leaf 3. The core layer devices spine 1 and spine 2 do not perceive a VXLAN network service, and are only configured to forward an Internet Protocol IP packet. The access stratum devices leaf 1, leaf 2, and leaf 3 are edge nodes of the VXLAN network 100, and are configured to access a virtual machine of a user. It can be seen from FIG. 1 that a VM 1 and a VM 2 access the VXLAN network 100 by using the leaf 1, and a VM 3 accesses the VXLAN network 100 by using the leaf 3. The Leaf 1, the leaf 2, and the leaf 3 are VTEPs of the VXLAN network. A VXLAN layer-3 gateway is separately deployed on the leaf 1, the leaf 2, and the leaf 3. A VXLAN tunnel is established between the three VXLAN layer-3 gateways, and a host route of the VM that accesses the VXLAN network 100 by using the VXLAN layer-3 gateway is published to another BGP neighbor by using the Border Gateway Protocol (BGP), so as to implement mutual communication between VMs crossing leaf nodes. Optionally, the Intermediate System to Intermediate System (ISIS) Protocol is deployed in all the three VXLAN layer-3 gateways, and the host route of the VM that accesses the VXLAN network 100 by using the VXLAN layer-3 gateway is carried to another VXLAN layer-3 gateway device by using a link state protocol data unit (LSP) packet, so as to implement mutual communication between VMs crossing leaf nodes.

In FIG. 1, an IP address of the VM 1 is IP_1, and a Media Access Control (MAC) address is MAC_1. An IP address of the VM 2 is IP_2, and a MAC address is MAC_2. An IP address of the VM 3 is IP_3, and a MAC address is MAC_3. An IP address of a VTEP used by the leaf 1 to access a host device is VTEP_1. An IP address of a VTEP used by the leaf 2 to access a host device is VTEP_2. An IP address of a VTEP used by the leaf 3 to access a host device is VTEP_3. The host device may be a device having an own IP address and an own MAC address, such as a VM, a server, or a personal computer (PC).

Figure 2:
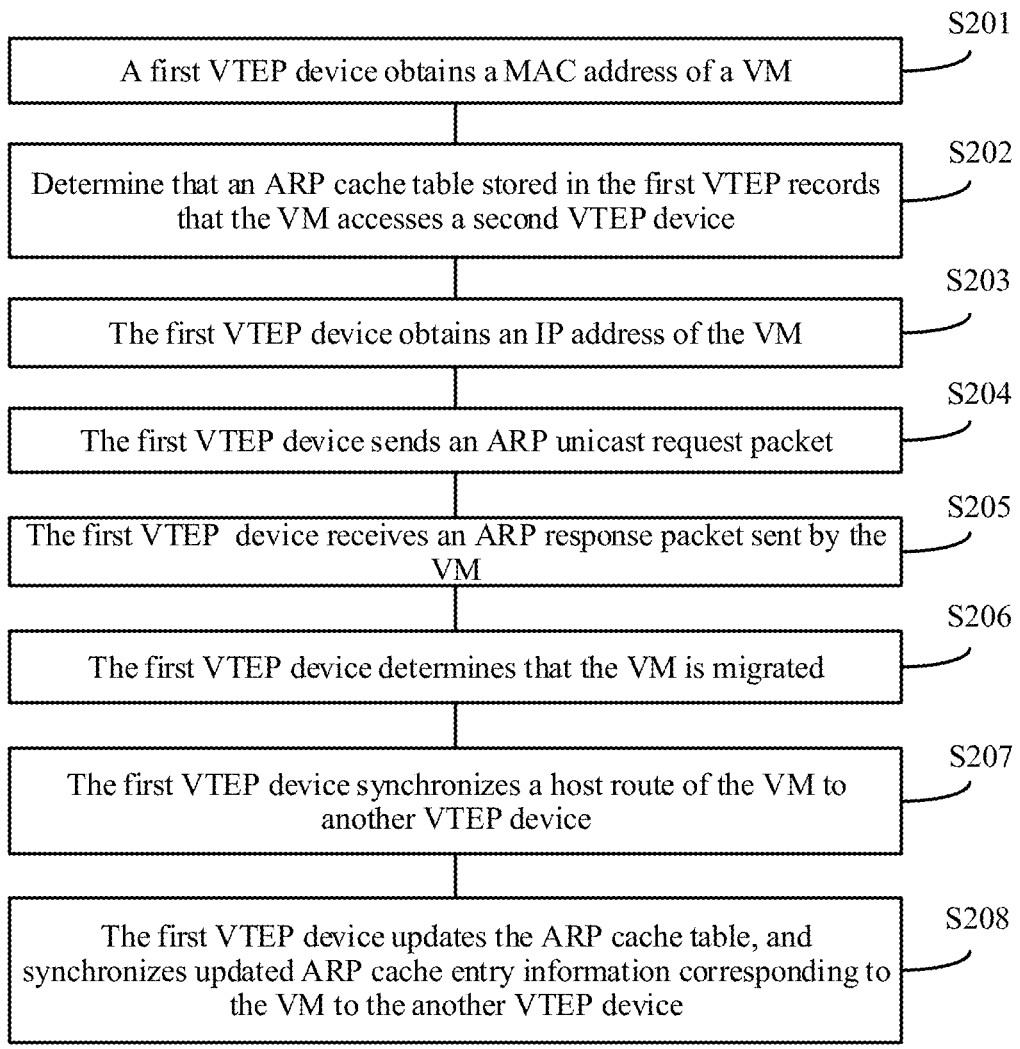
FIG. 2 is a flowchart of a method for determining virtual machine migration according to an embodiment of this application.

FIG. 2 shows an example of a method 200 for determining virtual machine VM migration according to an embodiment of this application. The method 200 may be applied to the VXLAN network 100 shown in FIG. 1. However, this embodiment of this application is not limited thereto.

S201. A first VTEP device obtains a first MAC address of a first VM from a first interface of the first VTEP device.

The first VTEP device may be configured to connect the first VM to a VXLAN network. For example, the first VTEP device may be the leaf 3 shown in FIG. 1. The first VM may be the VM 1 shown in FIG. 1. The first interface is connected to an attachment circuit (AC). For example, the first interface may be an eth1 interface of the leaf 3. This is not specifically limited in this embodiment of this application.

In a specific implementation, the first VTEP device receives a gratuitous ARP packet sent by the first VM, and the gratuitous ARP packet carries the first MAC address of the first VM. The first VTEP device obtains the first MAC address from the gratuitous ARP packet. Specifically, after the VM 1 is migrated from the leaf 1 to the leaf 3, the VM 1 sends a gratuitous ARP packet, where the gratuitous ARP packet includes the MAC address of the VM 1. The leaf 3 receives, from the eth1 interface, the gratuitous ARP packet sent by the VM 1, and obtains the MAC address of the VM 1.

In another specific implementation, the first VTEP device receives an RARP packet sent by the first VM, and the RARP packet carries the first MAC address of the first VM. The first VTEP device obtains the first MAC address from the RARP packet. Specifically, after the VM 1 is migrated from the leaf 1 to the leaf 3, the VM 1 sends the RARP packet, and the leaf 3 receives, from the eth1 interface, the RARP packet sent by the VM 1, and obtains the MAC address of the VM 1.

S202. The first VTEP device determines that an ARP cache table stored in the first VTEP device records that the VM accesses a second VTEP device.

Specifically, the first VTEP device searches, based on the first MAC address by using the first MAC address as a keyword, the ARP cache table in the Address Resolution Protocol cache ARP cache table stored in the first VTEP device, and determines that the ARP cache table stored in the first VTEP device records that the VM accesses the second VTEP device.

The second VTEP device may be specifically the leaf 1 shown in FIG. 1.

The ARP cache table includes an IP address of a host device that accesses a VTEP device, a MAC address of the host device, a VXLAN network identifier (VNI) of the host device, and an IP address of a VTEP accessed by the host device. The VTEP device synchronizes entry information of an ARP cache table generated and stored in the VTEP device to another VTEP device by using the BGP protocol. On the VTEP device, information such as a specific VTEP on which another host is distributed, and an IP address and a MAC address of the other host may be learned by querying the ARP cache table.

A basic format of the ARP cache table may be shown in Table 1.

TABLE 1

| IP   | MAC   | VNI  | VTEP   |
|------|-------|------|--------|
| IP_1 | MAC_1 | 1000 | VTEP_1 |
| IP_2 | MAC_2 | 1000 | VTEP_1 |
| IP_3 | MAC_3 | 1000 | VTEP_3 |

An "IP" field indicates the IP address of the host device that accesses the VTEP. A "MAC" field indicates the MAC address of the host device. A "VNI" field indicates the VXLAN network identifier of the host device. A "VTEP" field indicates the IP address of the VTEP accessed by the host device.

The following further describes Table 1 with reference to FIG. 1. Table 1 is specifically an ARP cache table stored on the leaf 3. Table 1 includes IP addresses, MAC addresses, VNIs, and IP addresses of accessed VTEPs that are of the VM 1 to a VM 3. The leaf 3 may determine, based on the IP addresses of the VTEPs accessed by the VM 1, a VM 2, and the VM 3, that the VM 3 is a local host that accesses the leaf 3, and the VM 1 and the VM 2 are remote hosts that access another VTEP device.

A basic format of the ARP cache table may also be shown in Table 2.

TABLE 2

| IP   | MAC   | VNI  | VTEP   | FLAG   |
|------|-------|------|--------|--------|
| IP_1 | MAC_1 | 1000 | VTEP_1 | remote |
| IP_2 | MAC_2 | 1000 | VTEP_1 | remote |
| IP_3 | MAC_3 | 1000 | VTEP_3 | local  |

For a common field description of Table 2 and Table 1, refer to the description of Table 1. Details are not described herein again. A difference between Table 2 and Table 1 lies in that the ARP cache table further includes a "FLAG" field. In Table 2, the "FLAG" indicates identification information and is used to identify whether the host device is the local host or a remote host relative to a local VTEP device, "remote" is used to identify that the host device is the remote host relative to the local VTEP device, and "local" is used to identify that the host device is the local host relative to the local VTEP device.

Table 2 is described with reference to FIG. 1. Table 2 is specifically an ARP cache table stored on the leaf 3. The leaf 3 node determines, by searching the ARP cache table, that the "FLAG" is displayed as "local" in an ARP cache entry corresponding to the VM 3, and the "FLAG" is displayed as "remote" in ARP cache entries corresponding to the VM 1 and the VM 2. Therefore, it is determined that the VM 3 is the local host that accesses the leaf 3, and the VM 1 and the VM 2 are the remote hosts.

After the VM 1 is migrated from the leaf 1 to the leaf 3, the leaf 3 receives, from the eth1 interface, the gratuitous ARP packet or the RARP packet sent by the VM 1 and obtains the MAC address of the VM 1. The leaf 3 searches, by using the MAC address of the VM 1 as the keyword, the ARP cache table stored on the leaf 3, and may determine, based on the "VTEP" accessed by the VM 1 or the "FLAG" recorded in the ARP cache table, that the ARP cache table records that the VM 1 accesses the other VTEP device, to be specific, the VM 1 is not a local host device.

A person skilled in the art may understand that Table 1 and Table 2 are only used to describe an example of a form of the ARP cache table, and this is not specifically limited in this embodiment of this application.

In the following, an ARP cache table stored in each VTEP device is described in the form of Table 2 in this embodiment of this application.

S203. The first VTEP device obtains a first IP address of the first VM.

Specifically, after S202, the leaf 3 searches, by using the first MAC address as the keyword, the ARP cache table locally stored on the leaf 3, hits an ARP cache entry that stores the first MAC address, and further obtains the first IP address from the hit ARP cache entry.

S204. The first VTEP device generates and sends a first ARP unicast request packet by using the first IP address as a destination IP address.

When the first VTEP device receives, from the first interface, the gratuitous ARP packet or the RARP packet sent by the first VM, and obtains the first MAC address. However, by searching the ARP cache table stored in the first VTEP device, it is found that the ARP cache table records that the first VM is the remote host that accesses the another VTEP device. Therefore, the first VTEP device obtains the first IP address through table lookup, and generates and sends the first ARP unicast request packet. The first VTEP device sends the first ARP unicast request packet to the first interface, so as to detect whether an ARP response packet sent by the first VM can be received. Therefore, whether the first VM has been in-migrated is determined.

Specifically, in S201, the leaf 3 determines that the VM 1 accesses the first VTEP device from the eth1 interface, but finds, by searching the ARP cache table, that the ARP cache table records that the VM 1 is the remote host that accesses the VTEP_1. Therefore, after obtaining the IP address of the VM 1, the leaf 3 generates the ARP unicast request packet by using the IP address of the VM 1 as the destination IP address, and sends the ARP unicast request packet to the eth1 interface, so as to detect whether the ARP response packet returned by the VM 1 can be received. Therefore, whether the VM 1 is migrated is determined, to be specific, whether the VM 1 is the local device that accesses the leaf 3.

S205. The first VTEP device receives a first ARP response packet sent by the first VM.

Specifically, when the leaf 3 sends the ARP unicast request packet, and receives, within a specified time, the first ARP response packet sent by the VM 1 for the first ARP unicast request packet, it indicates that the VM 1 is in-migrated.

S206. The first VTEP device determines that the first VM is migrated.

It can be learned that, in the method provided in this embodiment of this application, after the VM is migrated, an in-migration device of the VM needs to obtain only the MAC address of the VM, then may obtain the IP address of the VM by searching the ARP cache table, and further determine, through ARP learning, whether the VM is migrated. In this way, after the VM is migrated, the in-migration device does not need to be limited by a case in which the virtual machine sends the gratuitous ARP packet, to perceive in-migration of the VM. This effectively improves compatibility of a virtual machine configuration.

Optionally, the method 200 may further include S207: The first VTEP device generates a host route of the first VM based on the ARP unicast request packet or the ARP response packet, and synchronizes the host route to another VTEP device.

The first VTEP device generates the host route of the first VM by sending the first ARP unicast request packet or by using the received first ARP response packet sent by the VM.

In a specific implementation, the first VTEP device sends the first ARP unicast request packet from the first interface or receives the ARP response packet from the first interface. The first VTEP device converts the obtained ARP cache entry into the host route that points to the first VM, and publishes the host route of the first VM to the other VTEP device by using a routing protocol. Specifically, the first VTEP device obtains the IP address of the first VM and a corresponding physical interface by using the first ARP unicast request packet or the ARP response packet, so as to generate a routing entry that includes information about the physical interface, namely, the host route of the first VM. When a device in a network wants to access the first VM, the device finds the host route of the first VM based on longest match, and sends traffic to the first VTEP device.

The first VTEP device synchronizes the host route to the other VTEP device. Optionally, the first VTEP device may publish the host route by using a BGP packet. Optionally, the first VTEP device may also publish the host route by using an LSP packet. When receiving the BGP packet or the LSP packet sent by the first VTEP device, the other VTEP device locally stores the host route of the first VM carried in the packet, and identifies that the host route is synchronized by the first VTEP device.

Each VTEP device obtains, by synchronizing host routes of respective accessed virtual machines between VTEP devices, the host routes of the virtual machines that access all peer end VTEP devices, so as to speed up network route convergence.

Optionally, after S206, the method 200 may further include S208: The first VTEP device updates the ARP cache table to obtain updated ARP cache entry information corresponding to the first VM, and synchronizes the updated ARP cache entry information corresponding to the first VM to the other VTEP device.

In a specific implementation, with reference to FIG. 1, after determining that the VM 1 is the local host, the leaf 3 updates the locally stored ARP cache table, updates the ARP cache entry information corresponding to the VM 1, to obtain the updated ARP cache entry information corresponding to the VM 1, and synchronizes the updated ARP cache entry information corresponding to the VM 1 to the other VTEP device.

Before the VM 1 is in-migrated, when the ARP cache table locally stored on the leaf 3 is Table 2, after the leaf 3 determines that the VM 1 is in-migrated, the leaf 3 updates the ARP cache table, as shown in Table 3.

TABLE 3

| IP | MAC | VNI | VTEP | FLAG |
|----|-----|-----|------|------|
| IP_1 | MAC_1 | 1000 | VTEP_3 | local |
| IP_2 | MAC_2 | 1000 | VTEP_1 | remote |
| IP_3 | MAC_3 | 1000 | VTEP_3 | local |

ARP cache table information is synchronized between the VTEP devices, and consequently, each VTEP device obtains ARP cache table information stored in all the peer end VTEP devices, further obtains routing information of the accessed virtual machines stored in all the peer end VTEP devices, and can quickly and accurately perceive the virtual machine migration by searching the ARP cache table when the virtual machine is migrated.

A sequence of performing S206 to S208 is not limited in this embodiment of this application. For example, S206 may be performed before S207, or may be performed after S207. Likewise, a sequence of S207 and S208 is not specifically limited.

Figure 3:
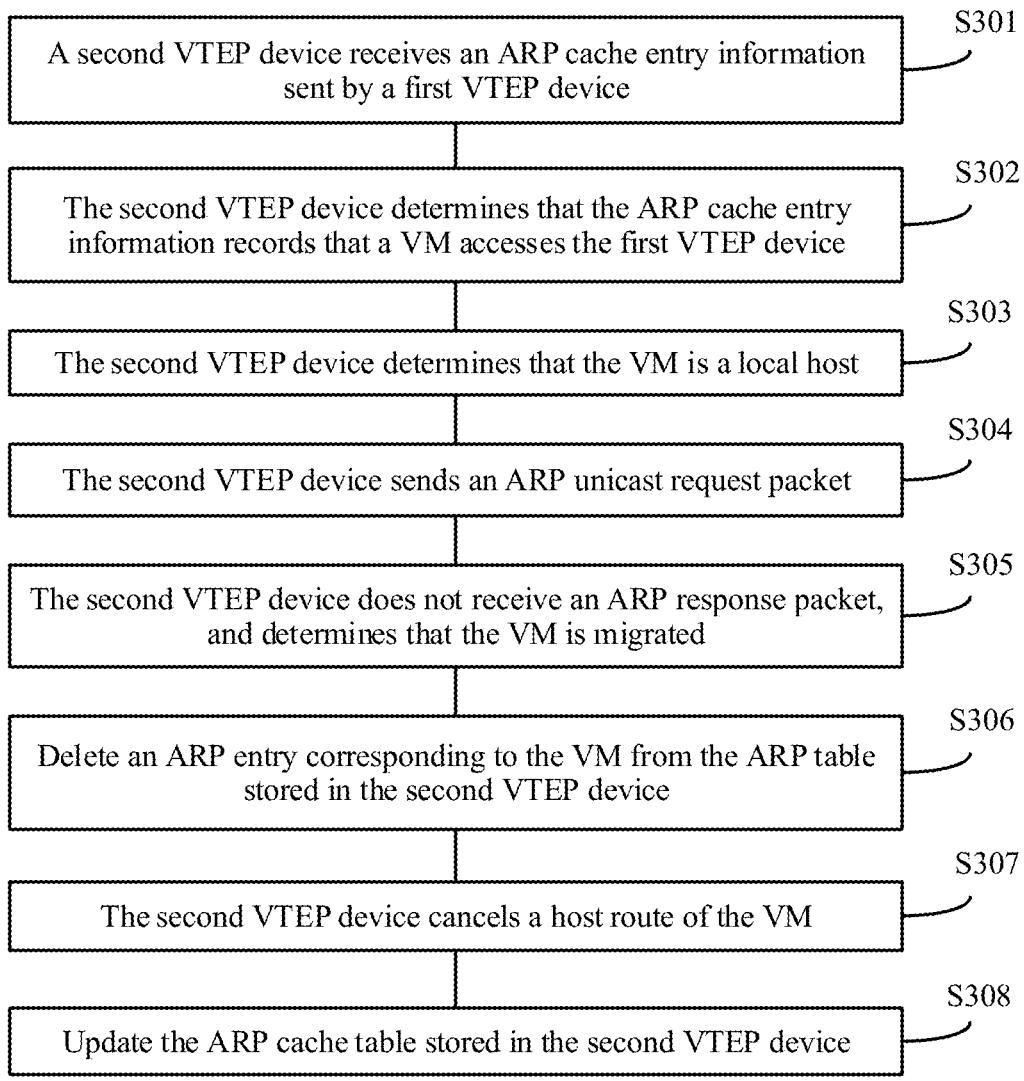
FIG. 3 is a flowchart of another method for determining virtual machine migration according to an embodiment of the present application.

FIG. 3 shows an example of a method 300 for determining virtual machine VM migration according to an embodiment of this application. The method 300 may be applied to the VXLAN network 100 shown in FIG. 1. However, this embodiment of this application is not limited thereto.

S301. A second VTEP device receives ARP cache entry information that is corresponding to a first VM and that is sent by a first VTEP device.

The second VTEP device may be configured to access a virtual machine VM. In a specific implementation, the second VTEP device may be the leaf 1 shown in FIG. 1. The first VM is the VM 1 shown in FIG. 1. The first VTEP device is the leaf 3 shown in FIG. 1. After the VM 1 is migrated from the leaf 1 to the leaf 3, and the leaf 3 perceives the VM 1 migration, the leaf 3 updates a locally stored ARP cache table, obtains updated ARP cache entry information corresponding to the first VM, and synchronizes the updated ARP cache entry information corresponding to the first VM to another VTEP device, for example, the leaf 1 and the leaf 2 shown in FIG. 1.

For a related description of the ARP cache table, refer to the description in the method 200. Details are not described herein again.

S302. The second VTEP device determines that the ARP cache entry information records that the first VM accesses the first VTEP device.

The second VTEP device determines, from the ARP cache entry information, an IP address of a VTEP accessed by the first VM, and further determines that the first VM accesses a first VTEP.

Specifically, with reference to FIG. 1, the leaf 1 determines, from the ARP cache entry information, that the IP address of the VTEP accessed by the VM 1 is VTEP_3, and further determines that the ARP cache entry information records that the VM 1 accesses the leaf 3.

S303. The second VTEP device determines that the ARP cache table stored in the second VTEP device records that the first VM is a local host.

After determining, from the received ARP cache entry information, that the first VM is a host that accesses the first VTEP device, the second VTEP device obtains a first MAC address or a first IP address of the first VM based on the received ARP cache entry information, searches the ARP cache table stored in the second VTEP device by using the first MAC address or the first IP address as a keyword, hits the ARP cache entry information of the first VM, and determines, from the ARP cache entry information based on the IP address of the VTEP accessed by the first VM or "FLAG" identification information, that the ARP cache table stored in the second VTEP device records that the first VM is the local host.

S304. The second VTEP device obtains a first IP address of the first VM, and generates and sends a second ARP unicast request packet by using the first IP address as a destination IP address.

Optionally, the second VTEP device obtains the first IP address from the received ARP cache entry information of the first VM sent by the first VTEP device. Optionally, the second VTEP device may also obtain the first IP address from the ARP cache table stored in the second VTEP device.

After obtaining the first IP address, the second VTEP device generates the second ARP unicast request packet by using the first IP address as the destination IP address, and sends the second ARP unicast request packet to a corresponding AC side interface, to detect whether a second ARP response packet returned by the first VM can be received.

S305. When the second VTEP device does not receive, within a predetermined time, a second ARP response packet sent by the first VM, the second VTEP device determines that the first VM is migrated.

In a specific implementation, the first VM has been migrated from the second VTEP device to the first VTEP device. Therefore, when the second VTEP device cannot receive, within the predetermined time, the second ARP response packet returned by the first VM, it is determined that the first VM has been out-migrated.

In the method provided in this embodiment, after receiving ARP cache entry information sent by all peer end devices, a VTEP device triggers the VTEP device to determine whether the virtual machine is migrated, so as to quickly and accurately perceive the virtual machine migration.

Optionally, after S305, the method 300 further includes S306: The second VTEP device deletes an ARP cache entry corresponding to the first VM from the ARP cache table stored in the second VTEP device.

When the second VTEP device does not receive the second ARP response packet within the predetermined time, the second VTEP device deletes the ARP cache entry corresponding to the first VM from the ARP cache table stored in the second VTEP device, and does not need to wait until an aging time of the ARP cache entry expires before performing aging. Therefore, an ARP cache table resource occupied by the ARP cache entry information is saved.

Optionally, after S305, the method 300 further includes S307:

The second VTEP device cancels a host route, pointing to the second VTEP device, of the first VM, and sends control information to another VTEP device, where the control information is used to instruct the other VTEP device to cancel the host route, pointing to the second VTEP device, of the first VM.

In a specific implementation, the control information is a BGP update message, and when determining that the accessed VM 1 has been out-migrated, the second VTEP device may send the BGP update message to the other VTEP device. The BGP update message carries a host address of the first VM, and is used to cancel the host route of the VM.

In another specific implementation, the control information may further be a Path Computation Element Protocol (PCEP) message, and is used to cancel the host route of the first VM by defining a new routing object and a new message type in the PCEP message. The new routing object carries the host address of the first VM, and the new message type is used to indicate that the PCEP message is used to cancel the host route of the first VM.

It should be understood that the above-listed types of the control information are only an example description, and shall not constitute any limitation on this application. A specific protocol used to cancel the host route of the first VM is not limited in this application.

Therefore, when determining that the host device that accesses the VTEP device is migrated, the VTEP device cancels the host route of the out-migrated virtual machine and sends the canceled host route of the out-migrated virtual machine to the other VTEP device, so as to speed up route convergence.

Optionally, after S305, the method 300 may further include S308: The second VTEP device updates, by using the ARP cache entry information sent by the first VTEP device, the ARP cache entry that is corresponding to the first VM in the ARP cache table stored in the second VTEP device.

In a specific implementation, with reference to FIG. 1, after determining that the VM 1 is out-migrated, the leaf 1 updates a locally stored ARP cache table. Before the VM 1 is out-migrated, the ARP cache table locally stored on the leaf 1 is shown in Table 4.

TABLE 4

| IP | MAC | VNI | VTEP | FLAG |
| --- | --- | --- | --- | --- |
| IP_1 | MAC_1 | 1000 | VTEP_1 | local |
| IP_2 | MAC_2 | 1000 | VTEP_1 | local |
| IP_3 | MAC_3 | 1000 | VTEP_3 | remote |

After determining that the VM 1 is migrated to the leaf 3, the leaf 1 updates the locally stored ARP cache table, as shown in Table 5.

TABLE 5

| IP | MAC | VNI | VTEP | FLAG |
| --- | --- | --- | --- | --- |
| IP_1 | MAC_1 | 1000 | VTEP_3 | remote |
| IP_2 | MAC_2 | 1000 | VTEP_1 | local |
| IP_3 | MAC_3 | 1000 | VTEP_3 | remote |

After obtaining synchronous ARP cache table information sent by a peer end VTEP device, the VTEP device updates the ARP cache table information stored in the VTEP device and updates in real time host routes of accessed virtual machines stored in all peer end VTEP devices, and can quickly and accurately perceive the virtual machine migration by searching the ARP cache table when the virtual machine is migrated, and speed up the route convergence.

It should be noted that a sequence of performing S306 to S308 is not limited in this embodiment of this application.

The foregoing describes methods for determining virtual machine migration according to embodiments of this application in detail with reference to FIG. 1 to FIG. 3. The following describes apparatuses for determining virtual machine migration and a system according to embodiments of this application in detail with reference to FIG. 4 to FIG. 7.

Figure 4:
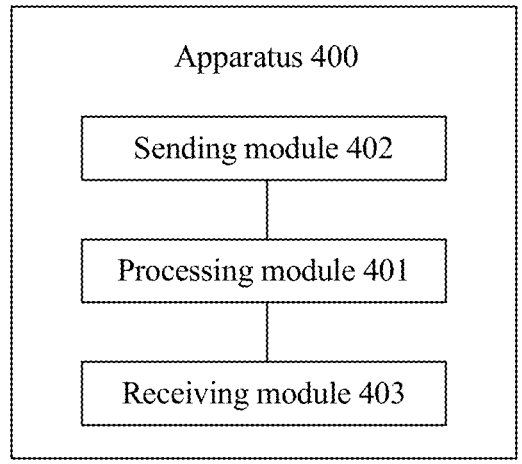
FIG. 4 is a schematic structural diagram of an apparatus for determining virtual machine migration according to an embodiment of this application.

FIG. 4 is a schematic diagram of an apparatus 400 for determining virtual machine migration according to an embodiment of this application. The apparatus 400 may be any node device in the leaf 1 to the leaf 3 in FIG. 1, and may be configured to perform the method shown in FIG. 2. As shown in FIG. 4, the apparatus 400 includes a processing module 401, a sending module 402, and a receiving module 403.

The processing module 401 is configured to obtain a first Media Access Control MAC address of a first VM from a first interface on an attachment circuit AC side of a first VTEP device. The processing module 401 is further configured to: search, by using the first MAC address as a keyword, an Address Resolution Protocol cache ARP cache table stored in the first VTEP device, and determine that the ARP cache table records that the first VM accesses a second VTEP device. The processing module is further configured to: obtain a first IP address of the first VM according to the ARP cache table, and generate a first ARP unicast request packet by using the first IP address as a destination IP address. The sending module 402 is configured to send the first ARP unicast request packet. The receiving module 403 is configured to receive, from the first interface, a first ARP response packet sent by the first VM for the first ARP unicast request packet. Responding to the received first ARP response packet, the processing module 401 is further configured to determine that the first VM is migrated.

It can be learned that after a VM is migrated, an in-migration device of the VM needs to obtain only a MAC address of the VM, and can determine that the VM is migrated. In this way, after the VM is migrated, the in-migration device does not need to be limited by a case in which the virtual machine sends a gratuitous ARP packet, to perceive in-migration of the VM. This effectively improves compatibility of a virtual machine configuration.

Optionally, the processing module 401 is further configured to: generate a host route of the first VM based on the first ARP unicast request packet or the first ARP response packet, and synchronize the host route of the first VM to another VTEP device.

Each VTEP device obtains, by synchronizing host routes of respective accessed virtual machines between VTEP devices, host routes of virtual machines that access all peer end VTEP devices, so as to speed up network route convergence.

Optionally, the processing module 401 is further configured to: after determining that the first VM is migrated, update, based on an IP address of a VTEP accessed by the first VM after migration, ARP cache entry information corresponding to the first VM, and synchronize the ARP cache entry information to the other VTEP device.

ARP cache table information is synchronized between the VTEP devices, and consequently, each VTEP device obtains ARP cache table information stored in all the peer end VTEP devices, further obtains routing information of the accessed virtual machines stored in all the peer end VTEP devices, and can quickly and accurately perceive the virtual machine migration by searching the ARP cache table when the virtual machine is migrated.

Optionally, the processing module is configured to obtain the first MAC address of the first VM based on a RARP packet or a gratuitous ARP packet that is sent by the first VM and that is received by the first interface.

The modules of the apparatus 400 in this embodiment of this application and the foregoing other operations and/or functions are respectively intended to implement corresponding procedures of the method 200 in FIG. 2. For brevity, details are not described herein again.

Figure 5:
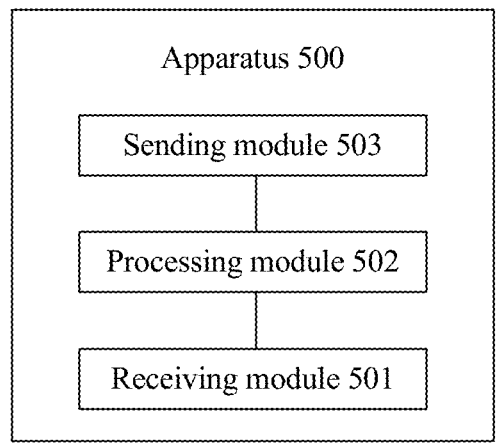
FIG. 5 is a schematic structural diagram of another apparatus for determining virtual machine migration according to an embodiment of this application.

FIG. 5 is a schematic diagram of an apparatus 500 for determining virtual machine migration according to an embodiment of this application. The apparatus 500 may be configured to perform the method shown in FIG. 2. As shown in FIG. 5, the apparatus 500 includes a receiving module 501, a processing module 502, and a sending module 503.

The receiving module 501 is configured to receive ARP cache entry information that is corresponding to the first VM and that is sent by a first VTEP device. The processing module 502 is configured to: determine that the ARP cache entry information records that the first VM accesses the first VTEP device, and determine that an ARP cache table stored in the second VTEP device records that the first VM is a local host accessing the second VTEP device. The processing module 502 is further configured to: obtain a first IP address of the first VM, and generate a second ARP unicast request packet by using the first IP address as a destination IP address. The sending module 503 is configured to send the second ARP unicast request packet. The processing module 502 is further configured to: when the receiving module 501 does not receive, within a predetermined time, a second ARP response packet sent by the first VM for the second ARP unicast request packet, determine that the first VM is migrated.

It can be learned that, after receiving ARP cache entry information sent by all peer end devices, a VTEP device triggers the VTEP device to determine whether the virtual machine is migrated, so as to quickly and accurately perceive the virtual machine migration.

Optionally, the processing module 502 is further configured to: after determining that the first VM is migrated, delete an ARP cache entry corresponding to the first VM from the ARP cache table stored in the second VTEP device.

It can be learned that, when the second VTEP device does not receive the second ARP response packet within the predetermined time, the second VTEP device deletes the ARP cache entry corresponding to the first VM from the ARP cache table stored in the second VTEP device, and does not need to wait until an aging time of the ARP cache entry expires before performing aging. Therefore, an ARP cache table resource occupied by the ARP cache entry information is saved.

Optionally, the processing module 502 is further configured to: after determining that the first VM is migrated, cancel a host route, pointing to the second VTEP device, of the first VM, and send control information to another VTEP device, where the control information is used to instruct the other VTEP device to cancel the host route, pointing to the second VTEP device, of the first VM. The sending module 503 is further configured to send the control information to the other VTEP device.

Therefore, when determining that a host device that accesses the VTEP device is migrated, the VTEP device cancels the host route of the out-migrated virtual machine and sends the canceled host route of the out-migrated virtual machine to the other VTEP device, so as to speed up route convergence.

Optionally, the processing module 502 is further configured to: after determining that the first VM is migrated, update, by using the ARP cache entry information sent by the first VTEP device, the ARP cache entry that is corresponding to the first VM in the ARP cache table stored in the second VTEP device.

After obtaining synchronous ARP cache table information sent by a peer end VTEP device, the VTEP device updates the ARP cache table information stored in the VTEP device and updates in real time host routes of accessed virtual machines stored in all peer end VTEP devices, and can quickly and accurately perceive the virtual machine migration by searching the ARP cache table when the virtual machine is migrated, and speed up the route convergence.

The modules of the apparatus 500 in this embodiment of this application and the foregoing other operations and/or functions are respectively intended to implement corresponding procedures of the method 300 in FIG. 3. For brevity, details are not described herein again.

The apparatus 400 and the apparatus 500 provided in the foregoing embodiments of this application are described only using division of the foregoing functional modules as an example. In actual application, the functions may be allocated to different functional modules for implementation as required. To be specific, an internal structure of a device is divided into different functional modules to implement all or some of the functions described above.

Figure 6:
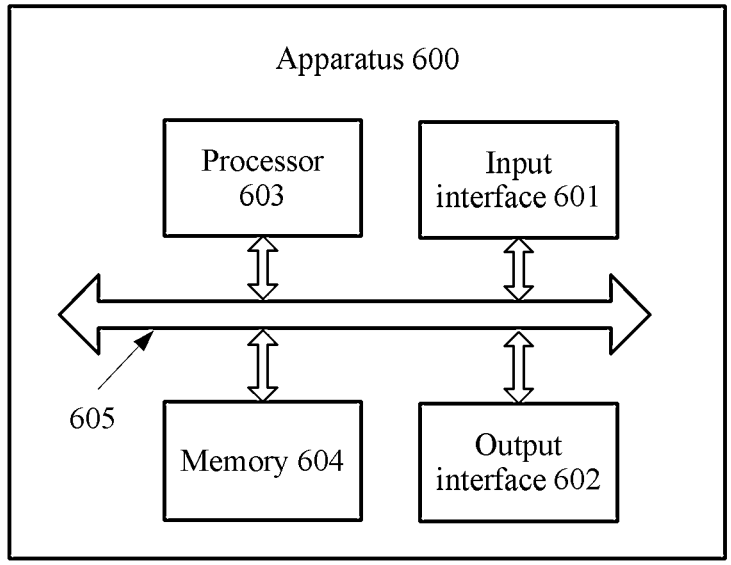
FIG. 6 is a schematic structural diagram of hardware of an apparatus for determining virtual machine migration according to an embodiment of this application.

FIG. 6 is another schematic diagram of an apparatus 600 for determining virtual machine migration according to an embodiment of this application. The apparatus 600 may be configured to perform the method 200 in FIG. 2. As shown in FIG. 6, the apparatus 600 includes an input interface 601, an output interface 602, a processor 603, and a memory 604. The input interface 601, the output interface 602, the processor 603, and the memory 604 may be interconnected by using a bus system 605.

The memory 604 is configured to store a program, an instruction, or code. The processor 604 is configured to execute the program, the instruction, or the code in the memory 604, so as to control the input interface 601 to receive a signal, control the output interface 602 to send a signal, and perform operations in S201 to S208.

Figure 7:
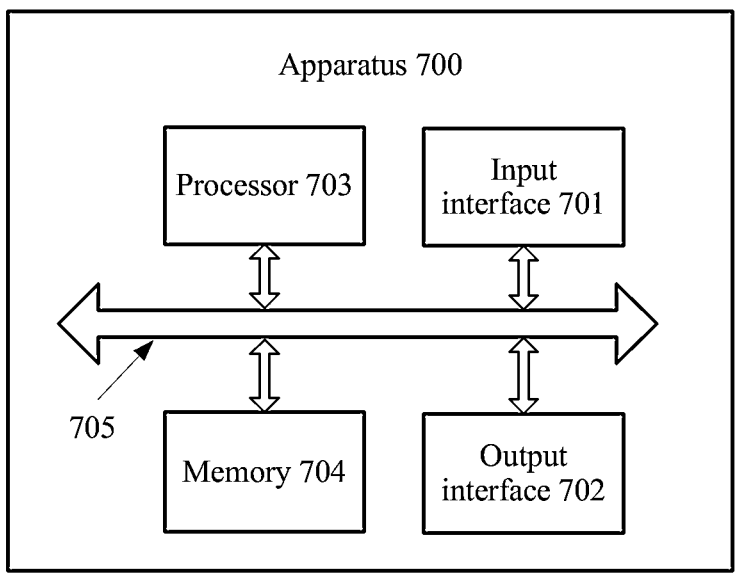
FIG. 7 is a schematic structural diagram of hardware of another apparatus for determining virtual machine migration according to an embodiment of this application.

FIG. 7 is another schematic diagram of an apparatus 700 for determining virtual machine migration according to an embodiment of this application. The apparatus 700 may be configured to perform the method 300 in FIG. 3. As shown in FIG. 7, the apparatus 700 includes an input interface 701, an output interface 702, a processor 703, and a memory 704. The input interface 701, the output interface 702, the processor 703, and the memory 704 may be interconnected by using a bus system 705.

The memory 704 is configured to store a program, an instruction, or code. The processor 704 is configured to execute the program, the instruction, or the code in the memory 704, so as to control the input interface 701 to receive a signal, control the output interface 702 to send a signal, and perform operations in S301 to S308.

It should be understood that, in this embodiment of this application, the processor 603 and the processor 703 may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 604 and the memory 704 may include a read-only memory and a random access memory, and respectively provide an instruction and data to the processor 603 and the processor 703. A part of the memory 604 or the memory 704 may further include a nonvolatile random access memory. For example, the memory 604 or the memory 704 may further store information about a device type.

In addition to a data bus, the bus system 605 and the bus system 705 may further include a power bus, a control bus, a status signal bus, and the like. However, for clarity of description, various buses are marked as the bus system in the figure.

In an implementation process, the steps in the method 200 and the method 300 may be respectively performed by using an integrated logic circuit of hardware or an instruction in a form of software in the processor 603 and the processor 703. Steps of the method for determining virtual machine migration provided with reference to embodiments of this application may be directly performed by a hardware processor, or may be performed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is separately located in the memory 604 and the memory 704. The processor 603 reads information in the memory 604, the processor 703 reads information in the memory 704, and the steps in the method 200 and the method 300 are respectively performed in combination with hardware of the processor 603 and the processor 703. To avoid repetition, details are not described herein.

It should be noted that the apparatuses provided in FIG. 4 and FIG. 6, and the apparatuses provided in FIG. 5 and FIG. 7 are applied to the network 100 shown in FIG. 1, to implement the method for determining virtual machine migration. In a specific implementation, the processing module 401 in FIG. 4 may be implemented by the processor 603 in FIG. 6, the sending module 402 may be implemented by the output interface 602 in FIG. 6, and the receiving module 403 may be implemented by the input interface 601 in FIG. 6. Likewise, the processing module 502 in FIG. 5 is implemented by the processor 703 in FIG. 7, the sending module 503 may be implemented by the output interface 702 in FIG. 7, and the receiving module 501 may be implemented by the input interface 701 in FIG. 7.

This application further provides a communications system, including the apparatus provided in an embodiment corresponding to FIG. 4 and the apparatus provided in an embodiment corresponding to FIG. 5. The communications system is configured to perform the method 200 in an embodiment corresponding to FIG. 2 and the method 300 in an embodiment corresponding to FIG. 3.

This application further provides a communications system, including the apparatus provided in an embodiment corresponding to FIG. 6 and the apparatus provided in an embodiment corresponding to FIG. 7. The communications system is configured to perform the method 200 in an embodiment corresponding to FIG. 2 and the method 300 in an embodiment corresponding to FIG. 3.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, modules and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and module, reference may be made to a corresponding process in the foregoing method embodiments, and details are not described herein again.

A person skilled in the art should be aware that in the foregoing one or more examples, functions described in this application may be implemented by hardware, software, or any combination thereof. When the functions are implemented in the form of a software functional module and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The embodiments in this specification are all described in a progressive manner, for same or similar parts in the embodiments, reference may be made to these embodiments, and each embodiment focuses on a difference from other embodiments. Especially, apparatus and system embodiments are basically similar to a method embodiment, and therefore are described briefly; for related parts, reference may be made to partial descriptions in the method embodiment.

In summary, it should be noted that what is described above is only example embodiments of the technical solutions of this application, but is not intended to limit the protection scope of this application. Obviously, a person skilled in the art can make various modifications and variations to this application without departing from the scope of this application. If these modifications and variations of this application fall within the scope of the following claims of this application and their equivalent technologies, any modification, equivalent substitution, and improvement made shall fall within the protection scope of this application.

What is claimed is:

1. A method comprising:
    after a virtual machine (VM) is migrated from a source device to a target device, obtaining, by the target device, a media access control (MAC) address of the VM from a local interface, and
    perceiving, by the target device, that the VM is migrated, based on a same MAC address having been received from the source device;
    probing by the target device, in response to the perceiving that the VM is migrated, by the target device, the VM by sending an address resolution protocol (ARP) request packet to the VM based on the MAC address of the VM;
    receiving, by the target device, an ARP response packet from the VM.

2. The method according to claim 1, further comprising:
    advertising, by the target device, a route to the source device, the route is a route to the VM.

3. The method according to claim 1, wherein obtaining, by the target device, a media access control (MAC) address of the VM from a local interface comprises:
    obtaining, by the target device, the MAC address of the VM according to a packet obtained from the local interface.

4. The method according to claim 3, wherein
    the packet is a reverse address resolution protocol (RARP) packet sent by the VM; or
    the packet is a gratuitous ARP packet sent by the VM.

5. The method according to claim 1, wherein the method further comprises:
    storing, by the target device, a correspondence between the MAC address of the VM and the local interface.

6. The method according to claim 1, wherein the method is applied in an Ethernet virtual private network (EVPN), the EVPN comprises the target device and the source device.

7. The method according to claim 1, wherein the ARP request packet is an ARP request packet that uses an Internet Protocol (IP) address of the VM as a target IP address.

8. The method according to claim 1, wherein the route is an Ethernet virtual private network (EVPN) integrated routing and bridging (IRB) route.

9. A method comprising:
    after a virtual machine (VM) is migrated from a source device to a target device, receiving, by the source device, a route sent by the target device, wherein the route is a route to the VM, the route comprises a media access control (MAC) address of the VM;
    perceiving, by the source device, according to the route to the VM, that the VM is migrated;
    probing, by the source device, the VM by sending an address resolution protocol (ARP) request according to the MAC address of the VM; and
    in response to the source device not receiving a response to the ARP request sent by the VM, determining, by the source device, that the VM has migrated.

10. The method according to claim 9, wherein after the determining, by the source device, that the VM has migrated, further comprising:
    deleting, by the source device, an ARP entry corresponding to the VM from an ARP table locally stored by the source device.

11. The method according to claim 9, wherein after the determining that the VM has migrated, the method further comprises:
    withdrawing, by the source device, the route.

12. The method according to claim 9, wherein after the determining, by the source device, that the VM has migrated, further comprising:

updating, by the source device, an ARP entry corresponding to the VM in an ARP table locally stored by the source device.

13. The method according to claim 9, wherein the method is applied in an Ethernet virtual private network (EVPN), the EVPN comprises the target device and the source device.

14. The method according to claim 9, wherein the ARP request packet is an ARP request packet that uses an Internet Protocol (IP) address of the VM as a target IP address.

15. The method according to claim 9, wherein the route is an Ethernet virtual private network (EVPN) integrated routing and bridging (IRB) route.

16. An apparatus, wherein the apparatus is located on a target device side, comprising:
    a non-transitory memory storing instructions; and
    a processor coupled to the non-transitory memory; wherein the instructions, when executed by the processor, cause the apparatus to:
    after a virtual machine (VM) is migrated from a source device to the target device, obtain a media access control (MAC) address of the VM from a local interface, and perceive, according to a same MAC address already learned from the source device, that the VM is migrated;
    probe, by the target device, in response to the perceiving that the VM is migrated, the VM by sending an address resolution protocol (ARP) request packet to the VM according to the MAC address of the VM;
    receive an ARP response packet from the VM.

17. The apparatus according to claim 16, wherein the instructions, when executed by the processor, further cause the apparatus to:
    advertise a route to the source device, the route is a route to the VM.

18. The apparatus according to claim 16, wherein the instructions, when executed by the processor, further cause the apparatus to:
    obtain the MAC address of the VM according to a packet obtained from the local interface.

19. The apparatus according to claim 16, wherein the apparatus is applied in an Ethernet virtual private network (EVPN), the EVPN comprises the target device and the source device.

20. An apparatus, wherein the apparatus is located on a source device side, and the apparatus comprises:
    a non-transitory memory storing instructions; and
    a processor coupled to the non-transitory memory; wherein the instructions, when executed by the processor, cause the apparatus to be configured to:
    after a virtual machine (VM) is migrated from the source device to a target device, receive a route sent by a target device, wherein the route is a route to the VM, the route comprises a media access control (MAC) address of the VM;
    perceive according to the route to the VM, that the VM is migrated;
    probing the VM by the target device by sending an address resolution protocol (ARP) request according to the MAC address of the VM; and;
    in response to the source device not receiving a response to the ARP request sent by the VM is received, determine that the VM has migrated.

21. The apparatus according to claim 20, wherein the instructions, when executed by the processor, further cause the apparatus to be configured to:
    after the determining that the VM has migrated, delete an ARP entry corresponding to the VM from an ARP table locally stored by the source device.

22. The apparatus according to claim 20, wherein the instructions, when executed by the processor, further cause the apparatus to be configured to:
    after the determining that the VM has migrated, update an ARP entry corresponding to the VM in an ARP table locally stored by the source device.

23. The apparatus according to claim 20, wherein the apparatus is applied in an Ethernet virtual private network (EVPN), the EVPN comprises the target device and the source device.

* * * * *